(12) United States Patent
Burkhardt (10) Patent No.: US 7,162,374 B2
(45) Date of Patent: Jan. 9, 2007

(54) DEVICE FOR THE DETERMINATION OF FLOW PARAMETERS FOR A FLUID AND METHOD FOR OPERATING SUCH A DEVICE

(75) Inventor: Lutz Burkhardt, Hannover (DE)

(73) Assignee: Wagner Alarm-und Sicherungssysteme GmbH, Langenhagen (DE)

( * ) Notice: Subject to any disclaimer, the term of this patent is extended or adjusted under 35 U.S.C. 154(b) by 0 days.

(21) Appl. No.: 10/530,386

(22) PCT Filed: Aug. 28, 2003

(86) PCT No.: PCT/EP03/09560

§ 371 (c)(1),
(2), (4) Date: Apr. 6, 2005

(87) PCT Pub. No.: WO2004/034001

PCT Pub. Date: Apr. 22, 2004

(65) Prior Publication Data

US 2006/0074569 A1    Apr. 6, 2006

(30) Foreign Application Priority Data

Oct. 7, 2002 (DE) ................................. 102 46 747
Nov. 7, 2002 (DE) ................................. 102 51 891

(51) Int. Cl.
*G01F 17/00* (2006.01)
*G01F 23/00* (2006.01)
*G01L 7/00* (2006.01)

(52) U.S. Cl. ..................................... 702/50; 73/204.25

(58) Field of Classification Search .................... 702/50
See application file for complete search history.

(56) References Cited

U.S. PATENT DOCUMENTS

| 4,846,133 A | 7/1989 | Shiraishi et al. |
| 4,946,555 A * | 8/1990 | Lee et al. ..................... 162/49 |
| 5,339,687 A | 8/1994 | Gimson et al. |
| 6,450,024 B1 * | 9/2002 | McCulloch et al. ..... 73/204.25 |
| 2001/0025526 A1 | 10/2001 | Reymann et al. |

FOREIGN PATENT DOCUMENTS

| CH | 683800 | 5/1994 |
| DE | 38 10 240 | 2/1989 |

(Continued)

OTHER PUBLICATIONS

English translation of International Search Report

*Primary Examiner*—John Barlow
*Assistant Examiner*—Sujoy Kundu
(74) *Attorney, Agent, or Firm*—Collard & Roe, P.C.

(57) ABSTRACT

A device for determining flow parameters, particularly the temperature and flow speed and changes therein, in a fluid flow for monitoring and a fire recognition or oxygen measuring device provided with such a device are provided. A slow or sudden blockage, crack or break in a pipe system of an aspirative fire recognition device is recognized by a measurement technique, whereby an air flow sensor, operated with a constant excess temperature, is combined with a regulation algorithm, running in a microprocessor, for monitoring pipe system fluid flow or flow resistance. The required resistance of the air flow sensor can thus be calculated by an exact sensor calibration curve and a precise control loop formed. The measured values recorded by the air flow sensor are extremely reliable, such that changes in condition for the flow parameters provide information about the state of the pipe system or the intake system.

7 Claims, 4 Drawing Sheets

FOREIGN PATENT DOCUMENTS

| | | |
|---|---|---|
| DE | 690 11 099 | 12/1994 |
| DE | 196 05 638 | 6/1997 |
| DE | 44 07 209 | 1/2001 |
| DE | 199 24 400 | 1/2001 |

* cited by examiner

DEVICE FOR THE DETERMINATION OF FLOW PARAMETERS FOR A FLUID AND METHOD FOR OPERATING SUCH A DEVICE

CROSS REFERENCE TO RELATED APPLICATIONS

Applicant claims priority under 35 U.S.C. §119 of German Applications Nos. 102 46 747.1 filed on Oct. 7, 2002 and 102 51 891.2 filed on Nov. 7, 2002. Applicant also claims priority under 35 U.S.C. §365 of PCT/EP2003/009560 filed on Aug. 28, 2003. The international application under PCT article 21 (2) was not published in English.

BACKGROUND OF THE INVENTION

1. Field of the Invention

The present invention relates to a device for determining flow parameters, particularly the temperature, the flow velocity and its changes, in a stream of fluid to be monitored, particularly in smoke and gas intake detectors, having a thermoelectric air stream sensor that is operated in a constant temperature mode, a thermoelectric temperature sensor, and a regulation circuit for setting an excess temperature ΔT at the air stream sensor, as well as to a method for operating such a device, a corresponding work method, and a fire recognition device or oxygen measurement device equipped with such a device.

Devices for determining flow parameters, of the type stated initially, as well as corresponding methods for operating such devices, are particularly known from heating wire anemometry. In this connection, a heated wire is introduced into a flowing fluid; information about various flow parameters can be obtained using the amount of heat taken from the fluid.

In the case of heating wire anemometry, there are two fundamental modes of operation: constant flow operation and constant temperature operation, which is used in most cases, since here, among other things, the thermal inertia of the heating wire (sensor) is circumvented and thereby greater accuracy of the sensor is achieved.

The fundamental idea of the constant temperature operating mode is that of reducing the influence of the thermal inertia of the sensor in that the heating wire is kept at a constant temperature (resistance) and the heating current required for this is used as a measure of the flow velocity of the fluid. For this purpose, a Wheatstone bridge circuit is generally used, whereby the resistance and therefore the temperature of the heating wire always has a constant value, by means of feedback. In thermal equilibrium, the heat loss of the sensor must be equal to the added electric power. From the point of view of anemometry, the relationship between the fluid velocity and the electric power is of primary interest. This relationship is extremely complex, non-linear, and can only be described by means of an empirical law (King) that must be modified in accordance with the given circumstances, in each instance. In the assessment, the use of a linearizer therefore becomes necessary.

2. Description of Related Art

Figure 1:
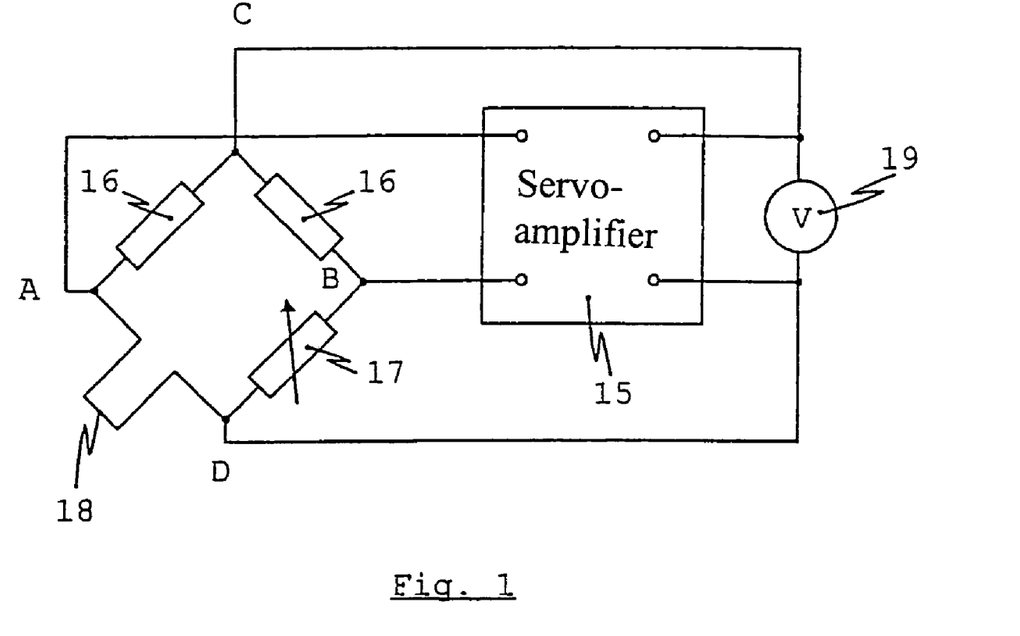
FIG. 1: a fundamental schematic of a constant temperature anemometer according to the state of the art.

FIG. 1 shows the fundamental schematic of a constant temperature anemometer. In the state of equilibrium, a certain voltage is applied at the perpendicular diagonal C-D of the bridge, which voltage is supplied by a servo amplifier 15. If the convective cooling at the sensor 18 changes, then a small voltage will occur at the horizontal diagonal A-B, which is fed back to the perpendicular diagonal C-D of the bridge, after having been amplified many times. In this connection, the polarity of this feedback voltage is selected in such a manner that the bridge equalizes automatically.

Aside from the complex relationship between the fluid velocity and the electric power detected as the measurement parameter, there is an additional problem in that the sensor responds to any change in heat removal, which can also be caused by a change in the temperature or the pressure of the flow medium, for example. This is particularly problematic if the method is being used continuously, in order to be able to draw reliable conclusions with regard to the status of the pipe system in which the fluid is flowing, for example, on the basis of changes in the measured flow parameters.

Particularly when monitoring the air stream in intake pipe systems in aspirative fire recognition devices or oxygen measurement devices, it is important that a blockage or a pipe break in the intake pipe system can be reliably detected, in order to be able to guarantee error-free operation of the fire recognition device or oxygen measurement device. Here, an aspirative fire recognition device is understood to be a device that actively draws in a representative partial amount of the space air of a space to be monitored, at a plurality of locations, by way of a pipeline system or channel system, and then passes these partial amounts to a detector for determining a fire characteristic value, or for detecting gases in the air, particularly oxygen.

An aspirative fire recognition device essentially consists of an intake pipe system having individual, small openings, a fan that draws an air sample from the target space via the intake openings of the intake pipe system, as well as a detector in which fire characteristic values of the air sample drawn in are subsequently determined. Since an aspirative fire recognition device actively draws in air samples from the target space, and therefore draws in any fire characteristic values that might be present, such devices react to fires that are starting in much faster and more sensitive manner than traditional solutions. Therefore the best possible intervention possibility is presented.

The term fire characteristic value is understood to mean physical variables that are subject to measurable changes in the environment of a fire that is starting, e.g. the ambient temperature, the proportion of solids or liquids or gases in the ambient air (formation of smoke in the form of particles or aerosols or vapor), or the ambient radiation. An aspirative fire recognition device is furthermore used anywhere where even the smallest, barely perceptible fire recognition characteristic values are supposed to be detected, and particularly serve to monitor premises and spaces, for example those containing EDP systems or server rooms.

In closed spaces whose furnishings and fixtures react sensitively to the effects of water, such as EDP areas, electrical switching or distributor rooms, or storage areas with high-value goods, so-called inertiatization methods are increasingly being used to reduce the risk of fire and for extinguishing fires. The extinguishing effect that results from this method is based on the principle of oxygen displacement. Normal ambient air is known to be comprised of 21 vol.-% oxygen, 78 vol.-% nitrogen, and 1 vol.-% other gases. For extinguishing and preventing fires, the inert gas concentration in the space in question is increased, and the oxygen proportion is decreased, by introducing an oxygen-displacing inert gas, such as pure nitrogen. Many substances no longer burn if the oxygen proportion drops below 15–18 vol.-%. Depending on the flammable material present in the space in question, a further decrease in the oxygen proportion, to 12 vol.-%, for example, might be necessary.

Such an inert gas device for carrying out the stated inertiatization method has essentially the following components: an oxygen measurement device to measure the oxygen content in the target space to be monitored; a fire recognition device for detecting a fire characteristic value in the space air or the target space; a control for evaluating the data of the oxygen measurement device and the fire recognition detector, and for sequence control of the inertiatization method; and a system for the production and sudden introduction of inert gas into the target space.

The oxygen measurement device serves to set the base inertiatization level in the target space. If a threshold of the oxygen concentration is exceeded (for example due to a leak in the target space), the control issues a command to a special system for introducing inert gas into the space, so that the oxygen proportion is reduced. The oxygen measurement device signals when the threshold value of the base inertiatization level has been reached again. In this connection, the location of the base inertiatization level is dependent on properties of the space.

In a preferred use, an aspirative fire recognition system is combined with an inert gas device for preventing and/or extinguishing fires. In this connection, the oxygen measurement device and the fire recognition device of the inert gas device are integrated into the aspirative fire recognition system. The latter then takes on the task of making the data required for monitoring the target space available to the control, from the air sample drawn in.

In order to be able to guarantee problem-free and, to the greatest extent possible, maintenance-free functioning of an aspirative device, it is necessary to continuously monitor the volume stream of the air sample being supplied to the detector. However, the volume stream is dependent on the mass stream and the density of the air sample added, and this in turn is a function of the air pressure and the temperature. Therefore monitoring of the volume stream proves to be a complicated task in terms of measurement technology. In order to furthermore be able to reliably detect blockages in or damage to the intake pipe system, i.e. the intake openings, a high degree of measurement accuracy with regard to the volume stream monitoring is required. This also includes, among other things, compensation of the influence of the air density, i.e. the air pressure, in the case of the measurement technology being used to monitor the volume stream.

SUMMARY OF THE INVENTION

The present invention is based on the problem that the measurement techniques used until now for monitoring the volume stream in intake pipe systems of aspirative fire recognition devices are subject to overly great uncertainties, i.e. they take into consideration only the volume stream and not the flow resistance, in order to be able to provide reliable information about the status of the intake pipe system. The uncertainties are due, among other things, to the fact that the sensors used are dependent on the temperature of the fluid stream and on the air pressure, i.e. the density of the fluid, and are therefore unsuitable for continuous use, without equalization. Reliable monitoring of the volume stream in intake pipe systems furthermore requires an assessment of the measurement data that is as accurate as possible.

Furthermore, it is problematic, in the case of the solutions known from the state of the art, that only volume stream changes that last a long time are to be assessed. In this connection, it is usual to compare these changes with threshold values, whereby an air stream problem is reported if a threshold value is exceeded. However, in order to avoid error messages due to ambient influences (air pressure, temperature), relatively great threshold values are selected. But long pipes have a high flow resistance, so that a pipe break towards the end of the pipe results in only a small change in the air stream. This relatively small change in the air stream can generally not be detected with the devices and methods known from the state of the art.

On the basis of the problems described, the present invention is based on the task of further developing a device for air stream monitoring, of the type stated initially, used, in particular, in smoke alarms and gas intake alarms, in such a manner that continuous and maintenance-free detection of flow parameters is possible, which are sufficiently accurate to be able to provide reliable information about the status of the intake pipe system, as well as the task of indicating a corresponding method for the operation of such a device, and a corresponding work method.

This task is accomplished, according to the invention, in a device of the type stated initially, by means of a regulation algorithm that is contained in a regulation circuit of the device, and by way of which the excess temperature $\Delta T$ at the air stream sensor is kept constant.

The advantages of the invention particularly lie in the fact that the regulation circuit contains a regulation algorithm implemented in a microprocessor, by way of which the excess temperature $\Delta T$ at the air stream sensor is kept constant. In this way, the air stream sensor is precisely adjusted in its working point, i.e. working temperature, which is independent of variations or changes in the fluid temperature. Therefore the amount of heat taken from the thermoelectric air stream sensor actually corresponds only to the amount of heat taken from the fluid. In this embodiment, the electric current that flows through the air stream sensor, i.e. the electric power taken from the air stream sensor, actually represents only the measure for the flow parameter to be measured (velocity, mass stream, etc.), in advantageous manner, and is not subject to the uncertainties imposed due to variations in the fluid temperature.

The task underlying the invention is furthermore accomplished by means of a method for operating such a device, in which the air stream sensor is briefly raised to a peak temperature value.

The technical problem underlying the invention is furthermore solved, according to the invention, by means of a method for determining flow parameters, particularly the temperature T, the flow velocity w, and its changes $\Delta w$, in a fluid stream to be monitored, particularly in smoke and gas intake detectors, by means of the following method steps: The fluid temperature T is determined by means of a thermoelectric temperature sensor; the excess temperature $\Delta T$ set at a thermoelectric air stream sensor, operated in constant temperature mode, is regulated to a constant value as a function of the fluid temperature T; the amount of heat removed from the thermoelectric air stream sensor is determined; and an evaluation algorithm implemented in the microprocessor is used to determine flow parameters, particularly the temperature, the flow velocity, the flow resistance and its change, on the basis of the amount of heat removed.

The advantages of the invention particularly lie in the fact that a very effective method for determining flow variables, particularly in smoke and gas intake detectors, can be achieved, for optimization of the air stream monitoring in the pipeline system. Particularly because the excess temperature $\Delta T$ at the thermoelectric air stream sensor takes on a constant value, independent of the fluid temperature T, the result can be achieved that the thermoelectric air stream sensor is used precisely in its previously determined working point, i.e. working temperature, and therefore the electric power removed is actually dependent only on the fluid stream. The measurement error is clearly reduced because of the method according to the invention. In the case of the thermoelectric air stream sensor according to the invention, the amount of heat Q removed from the heated sensor by the fluid stream is the measure for the flow parameters to be determined. Since here, the excess temperature $\Delta T$ takes on a constant value, the amount of heat Q removed is identical to the heating power P supplied to the sensor. The heating power P is dependent on the heating current I, in accordance with the following equation (1):

$$P = I^2 \cdot R \qquad (1)$$

Here, R refers to the internal resistance of the sensor. The amount of heat Q removed from the sensor can be described as follows, by means of equation (2):

$$Q = [A + B \cdot (\rho \cdot V)^{1/n}] \cdot (\Delta T - T) \qquad (2)$$

Here, A, B, and n are sensor-specific constants that are determined experimentally before start-up of the sensor, i.e. by means of calibration, and $\rho$ represents the fluid density. From equations (1) and (2), it follows that the volume stream V and the mass stream ($\rho \cdot V$) of the fluid stream can be determined by way of the heating power P and the temperature T.

From equations (1) and (2), it follows that the volume stream V and the mass stream $N = \rho \cdot V$ of the fluid stream can be determined by way of the heating power P and the temperature T. The flow resistance $F_w$ in the pipe is dependent on the flow velocity w, as follows:

$$F_w = 0.5 \cdot c \cdot A \cdot \rho \cdot w^2 \qquad (3)$$

Since the volume stream V is dependent on the flow velocity w and the cross-section A of the pipe, according to $$V = A \cdot w \qquad (4)$$

it follows for the flow resistance $F_w$ in the pipe that:

$$F_w = 0.5 \cdot c \cdot \rho \cdot A^{-1} \cdot V^2 \qquad (5)$$

From equation (5), it follows that the flow resistance $F_w$ in the pipeline system and its changes can be determined by way of the volume stream V.

Furthermore, it is possible, based on these measurement values, to determine the changes in the flow resistance in the pipeline system. For this, it would be necessary to compare the current measurement values with starting measurement values that are recorded and stored in memory at start-up of the system, for example. Furthermore, the method according to the invention is suitable for detecting changes in the flow resistance in the intake pipe system. For this purpose, not only is a precise volume flow measurement performed, but also a compensation of the influence of the air or fluid density $\rho$ is performed, in order to be able to reliably determine the flow resistance. Using the stored starting values of the air stream and temperature sensors, as well as the current temperature and, if applicable, the current absolute air pressure, a correction factor is determined from a table set up for this purpose. This table is required because different intake pipe systems and different intake power values of the fan require different correction factors. It would be possible to record the current absolute air pressure by way of a separately implemented sensor for air pressure measurement, for example. Of course, other embodiments are also possible here.

Finally, the task underlying the invention is also accomplished by means of an aspirative fire recognition device that constantly takes samples of space air or equipment cooling air, from a space or piece of equipment to be monitored, and passes them to a detector for detecting a fire characteristic value, by way of a pipeline system, and that is equipped with a device as described above, for determining flow parameters.

Using the device according to the invention, a possibility for carrying out the method described above is indicated.

Preferred further developments of the invention are discussed below with regard to the determination device, with regard to the operating method, with regard to the determination method, and with regard to the aspirative fire recognition device and/or oxygen measurement device.

Thus, it is provided for the device that the microprocessor furthermore comprises an evaluation algorithm for calculating flow parameters using the electric heating power P of the air stream sensor, particularly for calculating the mass stream N, the flow velocity w, and the temperature T of the fluid stream. The advantage of this embodiment according to the invention lies in the fact that the regulation algorithm implemented in the microprocessor calculates the reference resistance of the thermoelectric air stream sensor in accordance with a precise sensor characteristic line, and a precise regulation circuit (e.g. PI regulator) can be formed. In this connection, the voltage at the thermoelectric temperature sensor can be measured using an AD converter, for example, and subsequently filtered in order to eliminate noise and other interference. Using the measured voltage, the temperature of the fluid stream $T_0$ is calculated. The desired constant excess temperature $\Delta T$ (for example 40° C.) is added to the fluid temperature $T_0$. The result is the reference temperature $T_{soll}$ of the thermoelectric air stream sensor. The reference resistance of the air stream sensor is determined from this, in the evaluation algorithm of the microprocessor, according to the precise sensor characteristic line. The regulator regulates the voltage at the heating wire of the air stream sensor, in order to set the actual value of the resistance of the air stream sensor to the reference value. In this way, the excess temperature $\Delta T$ is kept constant, according to the invention. The electric voltage and the electric current at or through the thermoelectric air stream sensor are measured using an AD converter, and subsequently filtered. From this, the electric power P is calculated, which simultaneously represents a measure for the air stream.

In a particularly advantageous embodiment of the device according to the invention, it is provided that the evaluation algorithm includes the recognition of small, sudden flow changes, particularly volume stream changes, of the fluid stream. For this purpose, not only a precise volume stream measurement but also a compensation of the influence of the air density is carried out, in order to be able to assess the flow resistance in this manner. Using stored starting values of the air stream sensor and the temperature sensor, as well as of the current temperature and, if applicable, the current air pressure, even small, sudden changes in the air flow can be detected. The fundamental idea here is that changes resulting from disruptive ambient influences (air pressure, temperature) generally proceed more slowly than a pipe break. The evaluation of small, sudden changes therefore also allows the detection of sudden blockages of a single intake opening, which occurs due to vandalism, for example, or if a cardboard box in a high shelf unit is placed in front of an intake opening.

In a particularly advantageous embodiment, it is provided that the evaluation algorithm includes the compensation of a temperature-dependent and/or pressure-dependent density change in the fluid stream. The advantage of this embodiment lies, in particular, in the fact that by means of taking into consideration the temperature-dependent or pressure-dependent change in density of the fluid stream, the electric power taken from the fluid stream is independent of variations in the density change of the fluid stream. In this way, the accuracy of the flow parameters determined by means of the present invention, particularly the flow resistance, is clearly improved.

A possible implementation of the determination device according to the invention provides that the microprocessor contains a memory for storing initial values of the flow parameters. The advantage of this embodiment lies in the fact that not only can flow parameters be calculated in the evaluation algorithm with a high degree of accuracy, but also longer-term status changes of the flow parameters can be detected. Since the calculation of the gradient of the flow parameters is based on the precise air stream values, it is advantageously possible, in this embodiment, to measure the changes in the pipe system of a smoke and gas intake detector, for example. Such changes can occur due to slow or sudden blockage, cracks, or breaks. Since the excess temperature ΔT at the air stream sensor is kept constant by means of the invention, the gradient of the air stream parameters is not subject to any temperature related or other kind of shift. Likewise, it is advantageous that an equalization of the air stream sensor that must be performed repeatedly is eliminated.

In a possible implementation, the air stream sensor is advantageously designed in such a manner that it can be briefly raised to a peak temperature value. This has the particular advantage that the air stream sensor is thereby characterized by its particularly long life.

For the operation of such a determination device, the air stream sensor is preferably designed in such a manner that it can be briefly raised to a peak temperature value of up to 500° C. In this way, the air stream sensor is freed of accumulated contaminants, in particularly effective manner, by means of the short-term operation at a greatly elevated temperature. In this connection, the entire heating power is used to burn off or release the dirt particles that are adhering to the air stream sensor. During this time, it is advantageous if the fan of the aspirative fire recognition device is shut off, in order to avoid any cooling at the air stream sensor. This cleaning ensures that no dirt particles are deposited or accumulated at the air stream sensor, even in continuous operation, so that the sensitivity of the sensor is always unchanged.

A possible implementation of the invention consists of integration of the device according to the invention, for determining flow parameters of an aspirative fire recognition device and/or oxygen measurement device, which takes samples of the space air or equipment cooling air from a space or piece of equipment to be monitored, and passes them to a detector for detecting a fire characteristic value, by way of a pipeline system. The advantage of this embodiment lies particularly in the fact that the air stream in the pipe system can be monitored precisely, and that even changes in the pipe system that might occur due to slow or sudden blockages, cracks, or breaks can be reliably detected. As a result, the aspirative fire recognition device and/or oxygen measurement device is particularly reliable and maintenance-free in use.

In another advantageous embodiment, it is provided that the air stream sensor or the temperature sensor of the device according to the invention is integrated particularly in the center, in the air entry channel of a detector for fire characteristic values of an aspirative fire recognition device and/or oxygen measurement device. The advantage of this embodiment lies in the fact that in this way, all the electrical components of the aspirative fire recognition device are brought together in one unit. As a result, the structure of such a fire recognition device and/or oxygen measurement device can be carried out in particularly clear and simple manner.

Finally, it is preferably provided that the air stream sensor is disposed at a position that is narrowed in cross-section, in the air entry channel of the aspirative fire recognition device and/or oxygen measurement device according to the invention. By means of this arrangement, the air stream sensor is located in a position in which the flow velocity is increased due to the narrowing of the cross-section. As a result, the dynamics of the air stream sensor are also increased. In this way, even extremely slight changes in the flow parameters can be detected and evaluated. As a result, the sensitivity of the device for determining flow parameters, according to the invention, is advantageously increased. At the same time, optimization of the monitoring of aspirative fire recognition devices and/or oxygen measurement devices can be achieved. Of course, other embodiments are possible here, as well.

BRIEF DESCRIPTION OF THE DRAWINGS

In the following, preferred exemplary embodiments of the invention are explained in greater detail, using the drawings. These show.

DETAILED DESCRIPTION OF PREFERRED EMBODIMENTS

FIG. 1 shows a fundamental schematic of a constant temperature anemometer according to the state of the art. The fundamental idea of the constant temperature operating mode consists in reducing the influence of the thermal inertia of a heating wire sensor 18 in that the sensor element 18 is always kept at a constant temperature (resistance), and that the heating current used for this purpose is used as a measure for the flow velocity. For this purpose, a Wheatstone bridge circuit is generally used, whereby the resistance and therefore the temperature of the heating wire 18 is always kept constant, by means of feedback.

In the state of equilibrium, a certain voltage is applied at the perpendicular diagonal C-D of the bridge, which voltage is supplied by the servo amplifier 15. If the convective cooling at the sensor 18 changes, then a small voltage will occur at the horizontal diagonal A-B, which is fed back to the perpendicular diagonal C-D of the bridge, after having been amplified many times. In this connection, the polarity of this feedback voltage is selected in such a manner that the bridge equalizes automatically. In this connection, the relationship between the flow velocity of the fluid and the anemometer voltage is not linear, so that the use of a linearizer is necessary for further evaluation. Usually, a direct calibration curve is used after linearization, in order to determine the flow velocity from the anemometer voltage. In general, the sensor 18 in the circuit shown in FIG. 1 responds to any change in heat removal. This can be caused, for example, also by changes in the temperature or the pressure of the fluid. In order to carry out a highly precise measurement of flow parameters, however, these parameters also have to be taken into consideration. With the fundamental schematic of the constant temperature anemometer shown in FIG. 1, according to the state-of the art, the variation in fluid temperature with reference to an excess temperature set at the sensor 18 is furthermore not taken into consideration. In order to carry out the most accurate measurement possible, it is practical to set a constant temperature difference, i.e. an excess temperature in the sensor 18.

Figure 2:
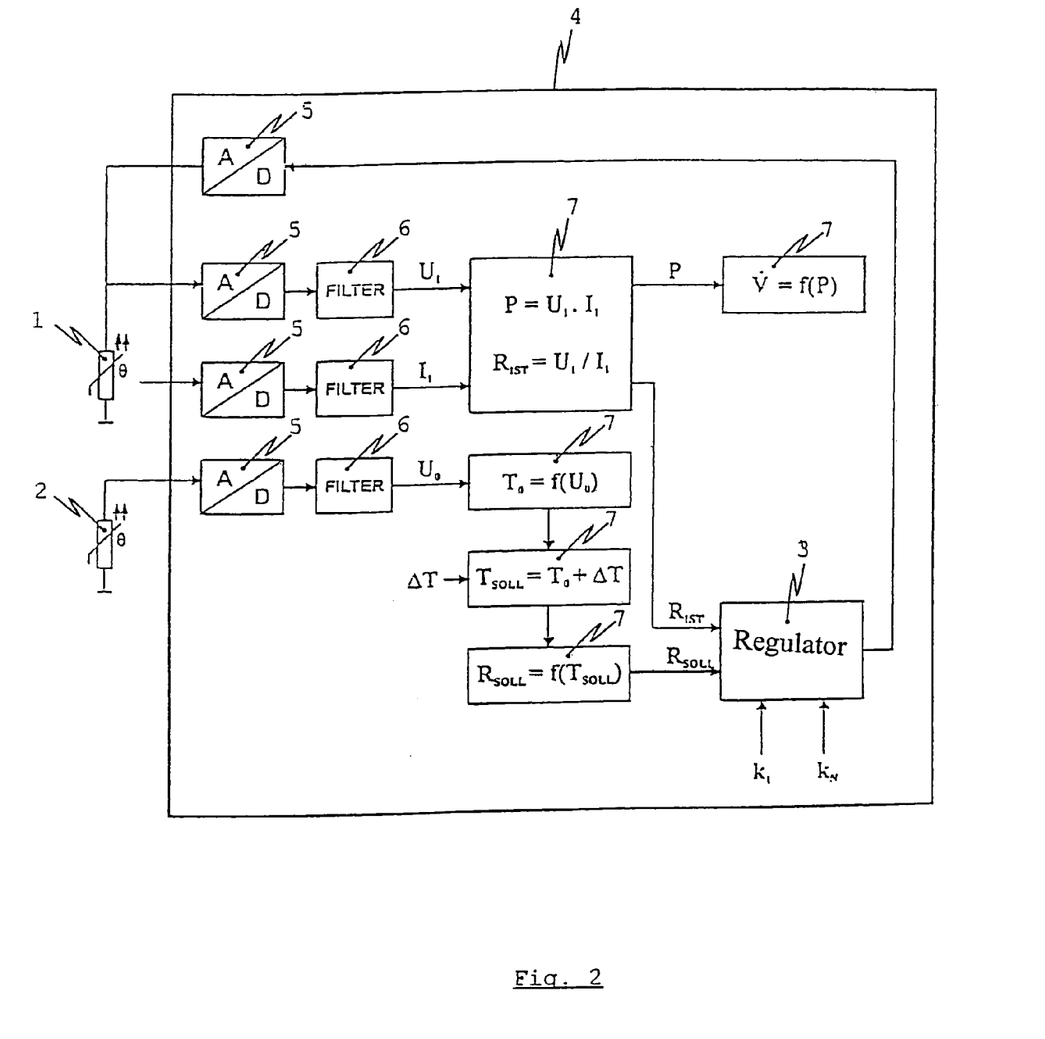
FIG. 2: a block diagram of the device for determining flow parameters according to the invention, according to a preferred exemplary embodiment.

FIG. 2 shows a block diagram of the device according to the invention for determining flow parameters, in accordance with a preferred exemplary embodiment. The device according to the invention comprises a thermoelectric air stream sensor 1, operated in the constant temperature mode, as well as a temperature sensor 2. The two sensors are introduced into the flow to be measured. Control and read-out of the sensors 1, 2 takes place by way of a regulation circuit 3. This circuit contains a regulation algorithm implemented in a microprocessor 4, by way of which the excess temperature $\Delta T$ at the air stream sensor 1 is kept constant. Therefore it is possible to calculate the reference resistance of the thermoelectric air stream sensor 1 according to a precise sensor characteristic line, and to form a precise regulation circuit. For this purpose, the voltage $U_0$ at the temperature sensor 2 is first measured using an AD converter 5. Subsequently, a filter 6 is used to eliminate noise and other interference. In an evaluation unit 7, the air temperature $T_0$ is calculated from this. The constant excess temperature $\Delta T$ previously established is added to the air temperature $T_0$ in another step. The result is the reference temperature $T_{soll}$ of the thermoelectric air stream sensor 1. The reference resistance of the sensor 1 is calculated from this, in the microprocessor 4, in accordance with the precise sensor characteristic line. Subsequently, the regulator 3 regulates the voltage at the air stream sensor 1, in order to set the actual value of the resistance to the reference value determined previously. In this way, the excess temperature $\Delta T$ at the air stream sensor 1 is kept constant.

In the determination of the flow velocity, the voltage $U_1$ and the current $I_1$ at the thermoelectric air stream sensor 1 are measured by means of an AD converter 5, and subsequently filtered with a filter 6. In another evaluation unit 7, the electric power P and the actual value of the resistance of the air stream sensor 1 are calculated from this. The electric power P that is required to keep the excess temperature $\Delta T$ constant is a measure for the air stream.

It is possible, by means of the exemplary embodiment of the device according to the invention as shown in FIG. 2, to measure the flow parameter almost without error, so that status changes in the flow parameters, particularly the flow resistance, can also be calculated. For this purpose, starting values of the flow parameters are stored in a memory (not explicitly shown) integrated in the microprocessor 4. The continuous calculation of the gradient of the flow parameters then takes place using the evaluation algorithm. By means of this embodiment, it is therefore possible to detect changes in the fluid stream that occur, for example, due to slow or sudden blockages, cracks, or a break of the flow channel.

In the case of a change in the density of the air due to changes in temperature and/or air pressure, the detected volume stream of the fluid also changes, although the pipe system has remained unchanged. A compensation of the air density change that becomes necessary as a result is carried out in the microprocessor 4. The compensation factor is determined using the starting values (temperature, air stream), and the current temperature. Optionally, an absolute air pressure sensor (not explicitly shown) is used to measure the air pressure.

Figure 3:
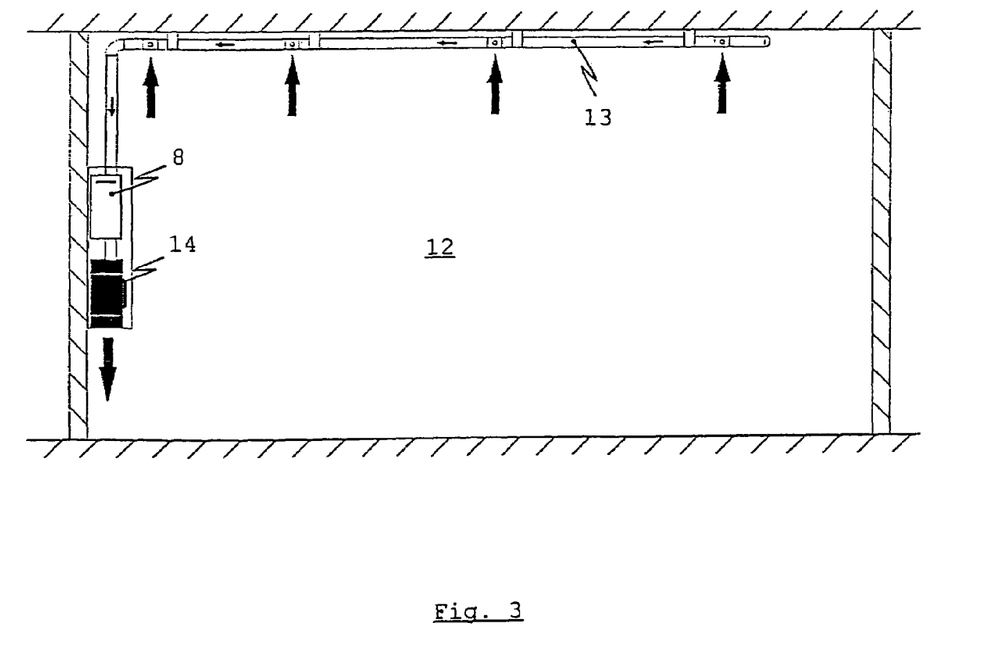
FIG. 3: a schematic representation of a preferred embodiment of the aspirative fire recognition device according to the invention.

FIG. 3 shows a schematic representation of a preferred embodiment of the aspirative fire recognition device or oxygen measurement device according to the invention. An intake pipe system 13 for drawing in air samples by way of various intake openings is disposed in a target space 12. The intake pipe system 13 is equipped with an intake detector in which the air samples from the target space 12 are passed to a detector 8 for recognizing fire characteristic values, i.e. for measuring oxygen and other gases. Furthermore, a fan 14 is provided, which serves to draw in air samples from the target space, by way of the pipeline system. In this connection, the intake power of the fan 14 is adapted to the related intake pipe system. In order to be able to guarantee error-free functioning of the aspirative fire recognition device or oxygen measurement device shown, it is necessary to continuously monitor the air stream passed to the detector 8 by way of the intake pipe system 13, and to recognize a problem with the intake in timely manner. For this purpose, the device according to the invention, for determining flow parameters, is located in the intake detector of the aspirative fire recognition device or oxygen measurement device.

Figure 4A:
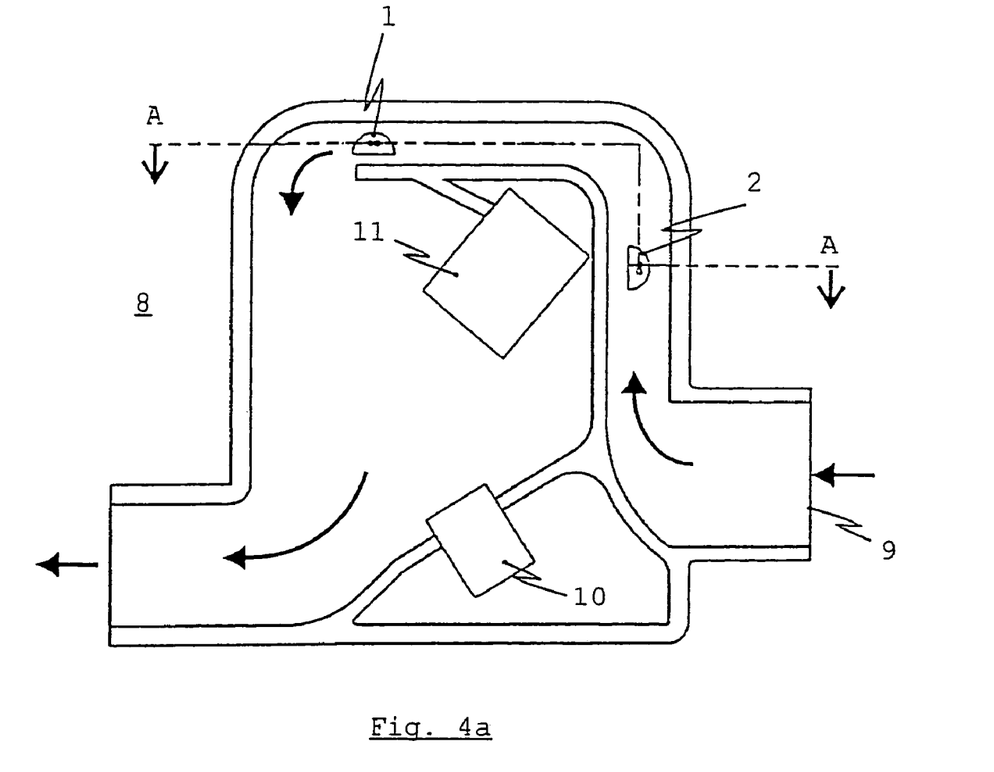
FIG. 4a: a longitudinal cross-section through a detector for fire characteristic values from the exemplary embodiment from FIG. 3.
Figure 4B:
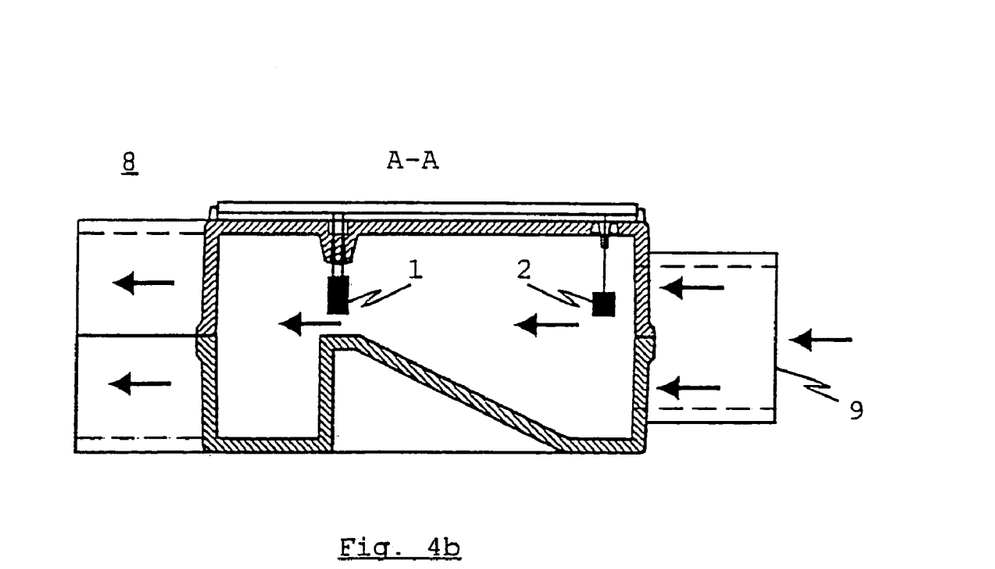
FIG. 4b: a cross-section through a detector for fire characteristic values from the exemplary embodiment from FIG. 3.

FIGS. 4a and 4b represent a longitudinal cross-section and a cross-section through the detector 8 for fire characteristic values, i.e. for gases from the exemplary embodiment according to FIG. 3. The cross-sectional line is indicated as a broken line in FIG. 4a. In the detector shown, the thermoelectric air stream sensor and the temperature sensor 1, 2 are integrated into the smoke and/or gas measurement cell of the intake detector. The two sensors 1, 2 are positioned in the center of the air entry channel 9. At the level of the air stream sensor 1, the cross-section is narrowed, in order to increase the flow velocity. In this way, the dynamics of the air stream sensor 1 are increased.

In a further development of the invention, the air stream sensor 1 is freed of contaminants by means of short-term operation at a greatly elevated temperature. During this time, the fan 14 is turned off, in order to avoid any cooling. The entire heating power is used to burn up or release the dirt particles that are adhering to the air stream sensor 1. During this time, no air stream evaluation takes place. The cleaning takes place either automatically at regular intervals, or under manual control. The result achieved by this cleaning is that the sensitivity of the air stream sensor 1 is not reduced due to deposits of dirt particles, even during extended operation.

REFERENCE SYMBOLS OF THE COMPONENTS

1 air stream sensor
2 temperature sensor
3 regulation circuit
4 microprocessor
5 AD converter
6 filter
7 evaluation unit 8 detector
9 air entry channel
10 gas sensor or smoke sensor
11 gas sensor or smoke sensor
12 target space
13 intake pipe system
14 fan
15 servo amplifier
16 resistor
17 potentiometer
18 heating wire sensor
19 voltage source

DESIGNATIONS OF THE PHYSICAL VARIABLES

P electric power
I sensor heating current
U sensor voltage
R sensor resistance
V volume stream
w flow velocity
$F_w$ flow resistance
C resistance co-efficient
ρ fluid density
N mass stream
T fluid temperature
Q amount of heat removed
A cross-section of the pipe

The invention claimed is:

1. A device for determining flow parameters, particularly the temperature, the flow velocity, the flow resistance and its change, in a fluid flow to be monitored, particularly in smoke and gas intake detectors, the device comprising:
   a thermoelectric air flow sensor that is operated in a constant temperature mode;
   a thermoelectric temperature sensor; and
   a regulation circuit for setting a predetermined excess temperature at the air flow sensor, the excess temperature defining a temperature difference between the temperature of the thermoelectric air flow sensor and the temperature of the fluid to be monitored,
   wherein the regulation circuit implemented in a microprocessor contains a regulation algorithm for operating the air flow sensor with a constant excess temperature, and
   wherein the microprocessor furthermore comprises an evaluation algorithm for monitoring fluid flow or flow resistance in the pipe system, the evaluation algorithm recognizing nongradual fluid flow changes not based on disruptive ambient influences.

2. The device according to claim 1,
wherein
the evaluation algorithm is furthermore configured for calculating flow parameters on the basis of the electric heating power of the air flow sensor, particularly for calculating a mass stream, a flow velocity, a volume stream, and a flow resistance of an intake pipe system, and a temperature of the fluid flow.

3. The device according to claim 1,
wherein
the evaluation algorithm includes a compensation of a temperature-dependent and/or pressure-dependent density change of the fluid flow.

4. The device according to claim 1,
wherein
the microprocessor contains a memory for storing starting values of the flow parameters, the starting values being used for calculating status changes in the flow parameters in the evaluation algorithm.

5. An assembly comprising:
(a) a pipe system for taking air samples from a target space;
(b) a detector for receiving the air samples from the pipe system; and
(c) a device for determining flow parameters disposed in the pipe system comprising a thermoelectric air flow sensor and a microprocessor programmed with a regulation algorithm for operating the air flow sensor with a constant excess temperature and with an evaluation algorithm for monitoring fluid flow or flow resistance in the pipe system, the evaluation algorithm recognizing nongradual fluid flow changes not based on disruptive ambient influences,
wherein the excess temperature defines a temperature difference between the temperature of the thermoelectric air flow sensor and the temperature of the air samples.

6. An assembly comprising:
(a) a pipe system for taking air samples from a target space; and
(b) a detector for receiving the air samples from the pipe system comprising an air entry channel having a center and a device for determining flow parameters comprising a thermoelectric air flow sensor disposed in the center of the air entry channel and a microprocessor programmed with a regulation algorithm for operating the air flow sensor with a constant excess temperature and with an evaluation algorithm for monitoring fluid flow or flow resistance in the pipe system, the evaluation algorithm recognizing nongradual fluid flow changes not based on disruptive ambient influences,
wherein the excess temperature defines a temperature difference between the temperature of the thermoelectric air flow sensor and the temperature of the air samples.

7. An assembly comprising:
(a) a pipe system for taking air samples from a target space; and
(b) a detector for receiving the air samples from the pipe system comprising an air entry channel having a portion narrowed in cross-section and a device for determining flow parameters comprising a thermoelectric air flow sensor disposed in the portion narrowed in cross-section of the air entry channel and a microprocessor programmed with a regulation algorithm for operating the air flow sensor with a constant excess temperature and with an evaluation algorithm for monitoring fluid flow or flow resistance in the pipe system, the evaluation algorithm recognizing nongradual fluid flow changes not based on disruptive ambient influences,
wherein the excess temperature defines a temperature difference between the temperature of the thermoelectric air flow sensor and the temperature of the air samples.

* * * * *